United States Patent
Insausti

[19]

[11] Patent Number: 5,803,542
[45] Date of Patent: Sep. 8, 1998

[54] SUPPLEMENTARY SEAT-BACK FOR VEHICLES

[76] Inventor: Juan Garmendia Insausti, Paseo Zarategui, 52 -20015 San Sebastian, Spain

[21] Appl. No.: 855,551

[22] Filed: May 13, 1997

[30] Foreign Application Priority Data

May 16, 1996 [ES] Spain ................................. 9601304 U

[51] Int. Cl.⁶ ....................................................... A47C 1/08
[52] U.S. Cl. ................ 297/256; 297/230.12; 297/452.14
[58] Field of Search ..................................... 297/256, 255, 297/256.1, 256.13, 256.15, 256.16, 229, 230.2, 452.14, 452.26, 464, 485, 487, 488; 5/653

[56] References Cited

U.S. PATENT DOCUMENTS

| | | | |
|---|---|---|---|
| 2,855,986 | 10/1958 | Engelen, Sr. | 297/452.26 X |
| 3,749,442 | 7/1973 | Berg et al. | 297/452.14 X |
| 4,161,337 | 7/1979 | Ross et al. | 297/230.12 |
| 4,637,629 | 1/1987 | Cummings | 297/464 X |
| 4,887,865 | 12/1989 | Dawidzon | 297/230.12 X |

FOREIGN PATENT DOCUMENTS

| | | | |
|---|---|---|---|
| 233761 | 5/1964 | Germany | 297/452.14 |
| 1052913 | 12/1966 | United Kingdom | 297/230.12 |

*Primary Examiner*—Laurie K. Cranmer
*Attorney, Agent, or Firm*—McAulay Fisher Nissen Goldberg & Kiel, LLP

[57] ABSTRACT

A supplementary seat-back for vehicles comprising two rigid jointed plates, one functioning as the seat body and the other as the back body. The plates serve as supports for cushions which form the exterior surface of the seat and back bodies. The plates are joined by side hinges and thus are foldable. The cushioning has slits or openings which can be adapted for the user's buttocks and scrotum and the cushion attached to the back plate has a central vertical slit for adapting to the spinal column.

4 Claims, 2 Drawing Sheets

SUPPLEMENTARY SEAT-BACK FOR VEHICLES

THE INVENTION

This invention comes in the shape of a supplementary seat-back especially made to fit the normal seats of any kind of vehicle, be it a car, lorry or bus; it can also be put to any other practical use where a certain amount of rigidity is required as regards the surface of both the seat and the back, and also serves as a side support for the user's body.

The aim of this invention is to make the user adopt an ideal position while driving a vehicle, in order to avoid discomfort and possible spinal injury.

THE REASONS BEHIND THE INVENTION

Many drivers are seated for long periods of time, and it is obvious that the seats designed by car manufacturers attempt to provide apparent comfort for the driver instead of correct seating adapted to the latter's body in order to avoid pain and possible spinal injury.

It is well known that people with some kind of disorder, such as lumbago, suffer from a weakening of the extensor muscles and of torso-rotation speed, making it impossible for them to bend the lower part of the spine.

It is also common knowledge that the sitting position, no matter what the kind of seat, creates an intradiscal pressure of 180–200% of body weight with respect to the overall surface of the intervertebral disc.

On the other hand, muscular chains have a direct, intense and immediate effect on the discal structure, therefore making it necessary to rest the spine against a good support which will hold it in place and thereby prevent pain-causing factors.

It is obvious that the choice of a position which avoids all increase in intradiscal pressure favours an intermediate or spontaneous position (between hyperlordosis and kyphosis, which increase this pressure), achieved by a slight lordosis of the thoraco-lumbar hinge.

It is likewise well known that a contraction, however slight, of the posterior muscular chains raises intradiscal pressure to critical thresholds.

However, the cause of lumbago does not only lie in vehicle seats, but in the position of the controls of the vehicle itself, and it is therefore necessary to avoid the elbows being raised too high and to hold the steering wheel with bent elbows. The knees should also be higher than the sacrum and the back should be in a comfortable position, in order to avoid continuous spasms and stressful psychic conditions.

DESCRIPTION OF THE INVENTION

The supplementary seat-back embraced by this invention was specially conceived in order to prevent all of these problems and disadvantages and to respect the conditions described in the above chapter.

More specifically, the supplementary seat-back constitutes what can be considered as a device for placing on top of the original seat when the vehicle is in use. This means that the supplementary seat-back, comprising two rigid pieces with complementary cushioned parts, is fitted in place so that the rigid part corresponding to the seat, and which comes with a posterior elongation, slots into the intersection between the two parts of the original car seat, while the piece comprising the back has a notch on the upper edge for fixing a piece comprising two connected parts, as the main point of support for the spine.

This said, both the upper cushioned part of the body corresponding to the seat and the front cushioned part corresponding to the body of the back, have a series of depressions or slits for adaptation to the respective parts of the user's body, specifically the slits on the seat for adapting the buttocks and scrotum and the slit on the back for adapting the area corresponding to the spine.

The fact that the two parts of the seat-back are jointed, means that they can be placed one on top of the other when not in use in order to form a folded body taking up only a small amount of storage space. This means that it can be comfortably stored away in the boot or any other part of the vehicle.

This supplementary seat-back is complemented with an element or device for holding the user's body in place, thereby preventing sideways movements of the latter. This element or device comprises two belts, the extremities of which are fitted with fastening systems; these belts have two cushioned side supports essential to the user, and which, in view of the fact that they slide back and forth along the belts, can therefore be placed in the required position and adapted to the user's body. This element or device has a special feature whereby it can be adjusted in the upwards-downwards direction in relation to the user's body, and can therefore be set at any height. This element or device obviously serves as a safety belt which encircles the side and front part of the user's body, and is fastened behind the back of the said supplementary seat-back.

Thanks to this device the spine is well supported and comfortably held in place, thereby avoiding pain-causing factors and favouring a position in which the user will avoid all increase in intradiscal pressure through a slight lordosis of the thoraco-lumbar joint.

Likewise, the supplementary seat-back and its side supports hold the torso in place, meaning that the user's body will move much less when driving round bends, and thereby create the subsequent corrective contractions.

Moreover, the rigidity of the seat-back will support the hip and hold it in place with a slight lumbar lordosis, thereby preventing sideways movements, while helping to keep the knees a little higher than the hip, so that the pedals of the vehicle are operated by moving the ankle, with the heel on the ground, and never with movements of the hip.

Subsequently, the rigidity of the seat-back means that it partly functions as a real lumbar orthosis reminiscent of the comfort felt by the back when we sit correctly on a classic kitchen chair.

DESCRIPTION OF THE DIAGRAMS

In order to complete this description and to better understand the characteristics of the invention, this descriptive report includes a series of illustrative and non-restrictive diagrams representing the following:

IDEAL CONSTRUCTION OF THE INVENTION

Figure 1:
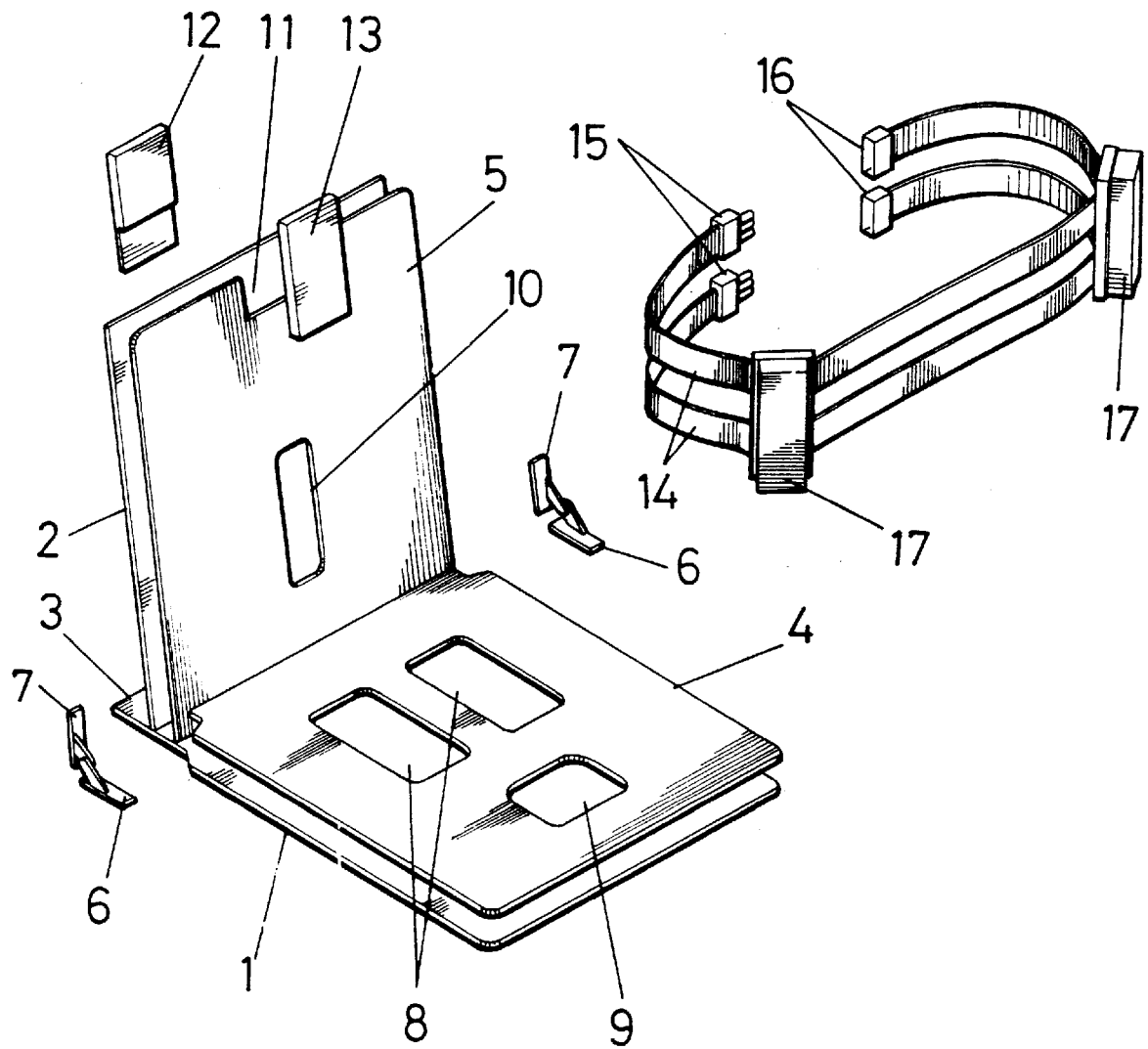
FIG. 1 shows a descriptive plan of the seat-back embraced by this invention, including the complementary belts and side supports intended to prevent sideways movements of the user's body.
Figure 2:
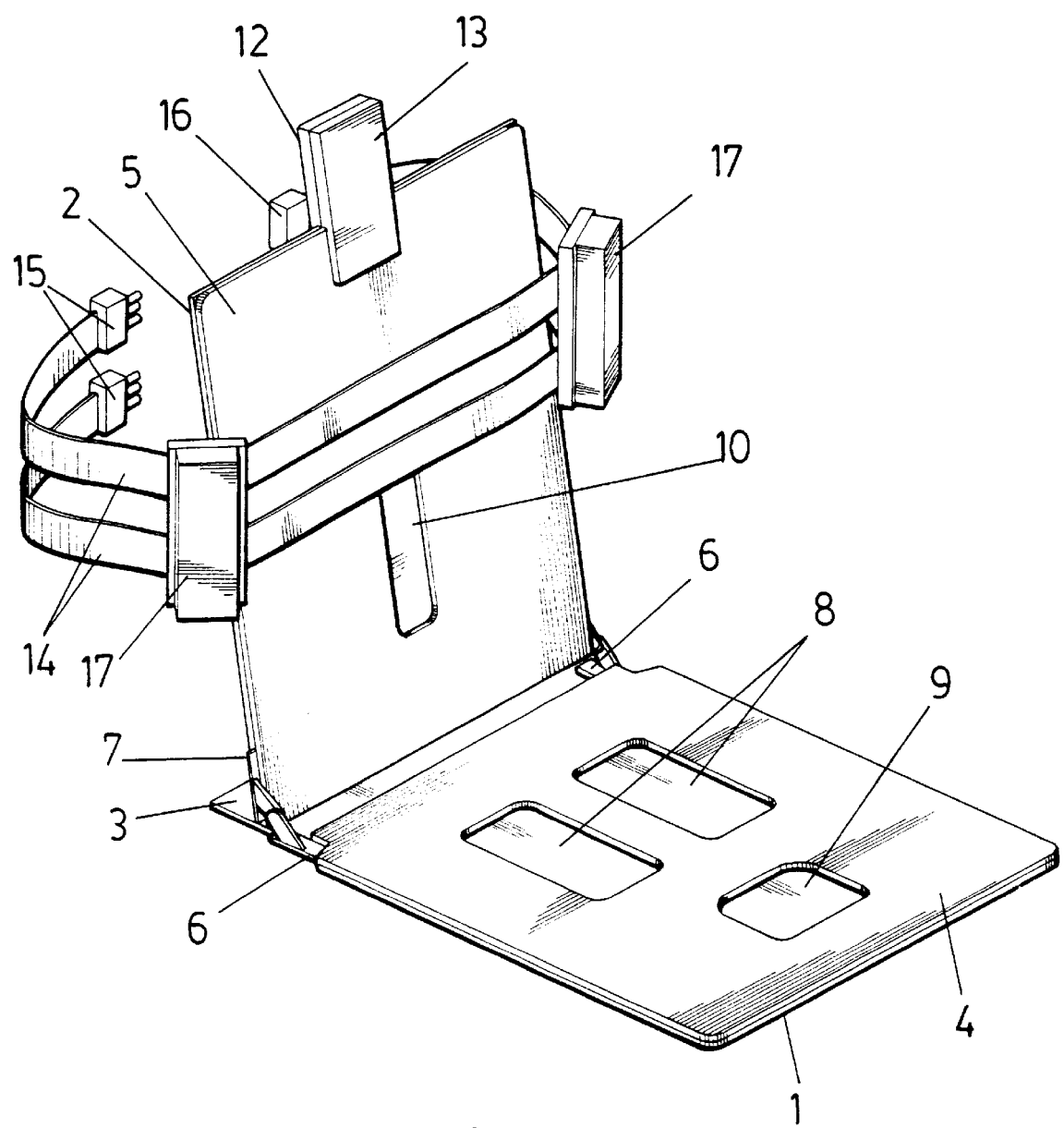
FIG. 2 shows the same seat-back as represented in the previous diagram with the belts and side supports in their position when in use.

As can be seen from the above-mentioned diagrams, the seat-back comprises two rigid plates (1) and (2). The former of the two belongs to the body of the seat and the latter to the body of the back, with the peculiarity that seat plate (1) has a slightly narrower elongation (3) for slotting into the space between the vehicle seat and its back.

Both the seat plate (1) and the back plate (2) come with their corresponding cushioned parts (4) and (5), which are upholstered and consist of one single piece in each case. The two parts forming the seat plate (1) with its cushioned part (4) and the back plate (2) with its cushioned part (5) are articulated by means of hinges (6) and (7) on either side, so that the wing (6) of the hinge is fitted to the seat plate (1) and the other wing (7) to the back plate (2). Hinges (6) and (7) open completely in order to allow the bodies of the seat and back to adopt the best position when the seat-back is in use, at the same time allowing the two parts of the seat-back to be folded one on top of the other in order to permit storage in the smallest possible space.

The cushioned part (4) of the seat plate has two slits or spaces (8) for the buttocks and another slit or space (9) for the scrotum, while the cushioned part (5) of the back plate also has a slit or space (10) thereby permitting greater support for the spinal column.

The upper part of the back plate comes with a notch (11) for fixing parts (12) and (13), which are joined to each other in order to serve as the main point of support for the spinal column.

The seat-back described herein comes complete with an element or device comprising two belts (14), the extremities of which are equipped with fastening systems (15) and (16), while two cushioned blocks (17) slide back and forth along the belts (14). These cushioned parts (17) are adjusted to the front or side of the user's body, and are fastened behind the plate making up the back part of the seat-back. Fastening systems (15) and (16) can be also be used to adjust the length of the belts (14), which can therefore be adapted to any size or shape of torso. In view of the fact that the cushioned parts (17) are adjustable, they can be moved back and forth along the belts (14) and adapted to the user's body, since the purpose of these cushioned parts (17) is to be placed on either side of the user in order to prevent sideways movements.

These features, as well as the fact that the part comprising the belts and cushioned blocks (17) can be adjusted in the upwards-downwards position, mean that the seat-back can be adapted to all kinds of users, no matter what the height or girth of their torso.

Together with the belt and side support accessory formed by parts (17) this seat-back can be applied to any kind of vehicle, be it a car, lorry or bus, and naturally to other kinds of seats. The sizes and materials used to make the seat-back can vary.

We believe it unnecessary to continue this description since experts on the subject will understand the full implications of the invention and its respective advantages.

The materials, shape, size and layout of the elements can be altered as long as no change is made to the essentials of the invention.

The contents of this report must be considered in the widest and non-restrictive sense.

I claim:

1. A supplementary seat-back for vehicles comprising first and second plates formed as a seat portion and a back portion, respectively;

hinge elements joining the plates to each other to allow the plates to be folded one upon the other;

seat and back cushions secured to the seat and back portions, respectively, the seat cushion having recesses therein corresponding to the user's buttocks and scrotum, and the back cushion having a vertically positioned recess corresponding to the user's spinal column, the back portion having a spine support mounted on a top edge thereof, said support being higher than the back portion.

2. The supplementary seat-back of claim 1 wherein the upper spine support is composed of two attached pieces having a notch therein and the top edge of the back portion is seated in said notch.

3. The supplementary seat-back of claim 1 which further comprises two independent belts having a complementary fastening systems for the user's extremities, the belts adapted for encircling the front part of the thorax and the sides of the user's body and being fastened to a back portion.

4. The supplementary seat-back of claim 3 wherein the independent belts have slidable cushions mounted thereon adapted for preventing sideways movement of the user.

* * * * *